G. H. ROWLEY.
MEANS FOR FASTENING MILK BOTTLES.
APPLICATION FILED JAN. 20, 1916.

1,180,741.

Patented Apr. 25, 1916.

WITNESSES

INVENTOR
George H. Rowley
PER
ATTORNEY

THE COLUMBIA PLANOGRAPH CO., WASHINGTON, D. C.

UNITED STATES PATENT OFFICE.

GEORGE H. ROWLEY, OF MONTREAL, QUEBEC, CANADA.

MEANS FOR FASTENING MILK-BOTTLES.

1,180,741.  Specification of Letters Patent.  Patented Apr. 25, 1916.

Application filed January 20, 1916. Serial No. 73,214.

*To all whom it may concern:*

Be it known that I, GEORGE H. ROWLEY, a citizen of the Dominion of Canada, residing at Montreal, in the county of Hochelaga, Province of Quebec, Canada, have invented certain new and useful Improvements in Means for Fastening Milk-Bottles, of which the following is a specification.

This invention relates to bottle fastening means and more particularly to a means of fastening milk bottles.

The invention consists of a set of hinge shaped members, one of the members being securely fastened to the inner side of the door or other object and the other member slidably mounted on the hinging pin.

The invention further consists of a cylindrical shaped rod, having an end bent U-shaped. This rod has notches along the top of the longer side. An orifice through the door, allows this long side of the rod to extend through the door, so that the lower side of the slidably mounted member, on the inner side of the door, will engage in the notches on the rod. The U-shaped end, on the outer side of the door is adapted to fit around the neck of a milk bottle.

The object of the invention is to provide a means for fastening a milk bottle or the like to a door or such like stationary object.

With this and other objects, the invention consists of certain novel combinations, constructions, and arrangements of parts as will be hereinafter fully described and claimed.

Figures 1, 2:
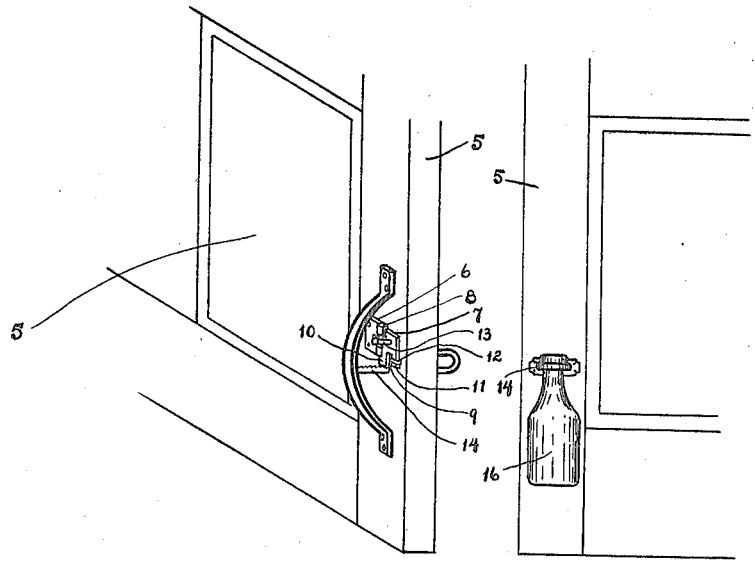
Figures 3, 4:
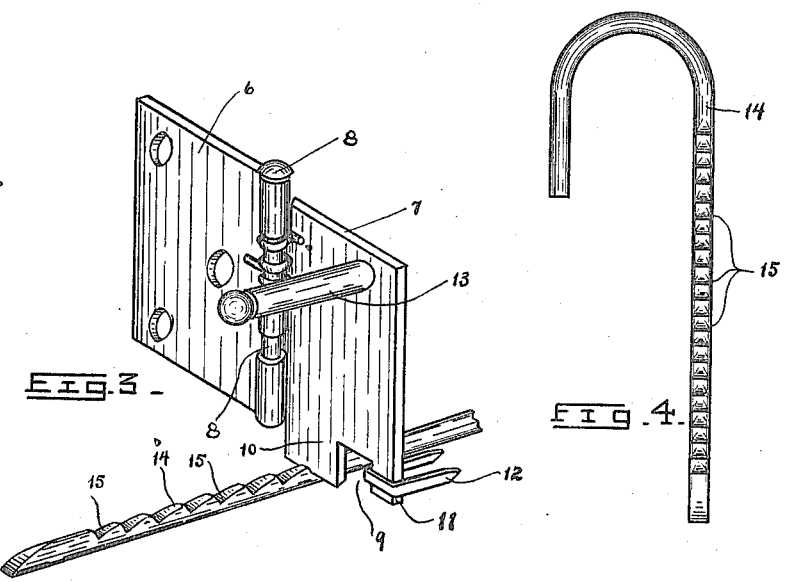

In the accompanying drawings:—Figure 1 is a perspective view of a lower corner of a door with my invention attached thereto. Fig. 2 is a view, showing the opposite side of the door shown in Fig. 1 and a milk bottle held by my invention. Fig. 3 is an enlarged perspective view of my invention. Fig. 4 is top view of the fastening rod.

In the drawings like figures designate like parts in the various views.

5 is a door, (only a corner of which is shown).

6 and 7 are flat rectangular members hinged together on the pin 8, so as to allow the member 7 to slide up and down a certain distance on the said pin 8. The member 7 has a notch 9 cut in its lower side, thus forming the two parts 10 and 11. 10 is beveled off on its inner corner and 11 is adapted to engage in the staple 12. 13 is a handle attached to member 7.

14 is a cylindrical rod having one end bent U-shaped and its other end tapered. On the upper side of rod 14, notches 15 are made. These notches are made with a straight upright side nearest the tapered end of a rod 14 and the other side has a gradual slant up. The door 5 has an orifice for the rod 14 to slide in and out through.

16 designates a milk bottle.

Having described the parts of my invention, I will now show how the same is applied. At night, the milk bottle is set out in the usual manner and the U-shaped end of rod 14 is pushed out sufficient length to allow the milk bottle to be placed in position for fastening. In the morning the milkman, takes a bottle of milk puts the neck in the U-shaped end of rod 14 and pushes rod 14 in toward the door. Now as the rod 14 is pushed in the part 10 of member 7 adapts itself in the various notches and when rod 14 is pushed in tightly it will securely hold it from being pulled out. Thus the bottle of milk is securely fastened to the door. The occupants of the house are the only persons who can unfasten it, as it must be unfastened from the inside. The person at the inside of the door simply lifts the member 7 by the handle 13 and now the rod 14 can be pulled out and the milk bottle taken therefrom.

Having thus described my invention, what I claim is:—

A bottle fastening means, having a pair of hinged members one of said members being adapted to be securely fastened to any desired stationary object, the other of said members being slidably mounted on the pin on which the said member hinges, the last said member being provided with a suitable handle, said member having a notch in its lower end, one of the parts of the said lower end being beveled on its inner side, the other part of the said lower end being adapted to engage in a staple driven into the said stationary object, a rod, having one end bent U-shaped and the other end tapered, said rod having notches on one side.

In testimony whereof I affix my signature in the presence of two witnesses.

GEORGE H. ROWLEY.

Witnesses:
CHAS. KERCHER,
ACHIE LAMONT.